US012771916B2

(12) United States Patent
Zhang et al.

(10) Patent No.: US 12,771,916 B2
(45) Date of Patent: Oct. 20, 2026

(54) PERISCOPIC CAMERA MODULE AND ELECTRONIC DEVICE HAVING THE SAME

(71) Applicant: TRIPLE WIN TECHNOLOGY(SHENZHEN) CO.LTD., Shenzhen (CN)

(72) Inventors: Rui Zhang, Jincheng (CN); Ding-Nan Huang, New Taipei (TW); Sheng-Jie Ding, Jincheng (CN); Shu-Qing Hao, Jincheng (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 1002 days.

(21) Appl. No.: 17/993,497

(22) Filed: Nov. 23, 2022

(65) Prior Publication Data

US 2026/0181231 A1 Jun. 25, 2026

(30) Foreign Application Priority Data

Sep. 23, 2022 (CN) ........................ 202211167415.9

(51) Int. Cl.
*H04N 23/54* (2023.01)
*G02B 23/08* (2006.01)

(52) U.S. Cl.
CPC ............ *H04N 23/54* (2023.01); *G02B 23/08* (2013.01)

(58) Field of Classification Search
CPC ........ H04N 23/50; H04N 23/51; H04N 23/54; H04N 23/55; G02B 23/02; G02B 23/08
See application file for complete search history.

(56) References Cited

U.S. PATENT DOCUMENTS

2021/0141206 A1* 5/2021 Ma .......................... H04N 23/54
2022/0011565 A1* 1/2022 Zhang ..................... H04N 23/57
2022/0245084 A1* 8/2022 Kim ....................... G06F 1/3278
2023/0126847 A1* 4/2023 Song ...................... H04N 23/54
348/335
2023/0388634 A1* 11/2023 Song ...................... H04N 23/69
2024/0098369 A1* 3/2024 Qu ....................... H04N 23/6812
2024/0429256 A1* 12/2024 Choi ...................... H04N 23/57

* cited by examiner

*Primary Examiner* — Kelly L Jerabek
(74) *Attorney, Agent, or Firm* — ScienBiziP, P.C.

(57) ABSTRACT

A periscope camera module includes a lens module, a photosensitive chip, and a circuit board assembly. The lens module includes a driver and a frame body. The driver includes a main body and a driving chip electrically connected to the main body. The frame body includes a first sidewall and a second sidewall. The driving chip is arranged on the first sidewall. A plurality of pins is provided on the driving chip. The photosensitive chip is arranged on the second sidewall. The circuit board assembly includes a first circuit board and a second circuit board. The first circuit board is arranged on and electrically connected to the photosensitive chip. The second circuit board is arranged on the drive chip. A plurality of pads is provided on a surface of the second circuit board facing the drive chip. The pads are electrically connected to the pins.

18 Claims, 7 Drawing Sheets

PERISCOPIC CAMERA MODULE AND ELECTRONIC DEVICE HAVING THE SAME

FIELD

The subject matter relates to imaging devices, and more particularly, to a periscopic camera module and an electronic device having the periscopic camera module.

BACKGROUND

Electronic devices, such as tablet computers and mobile phones, may have periscopic camera modules. The size of the periscopic camera module may affect the size of the electronic device. However, when the periscopic camera module has a high-magnification zooming function, the size of the periscopic camera module becomes large, which is not conducive to the miniaturization of the electronic device.

Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
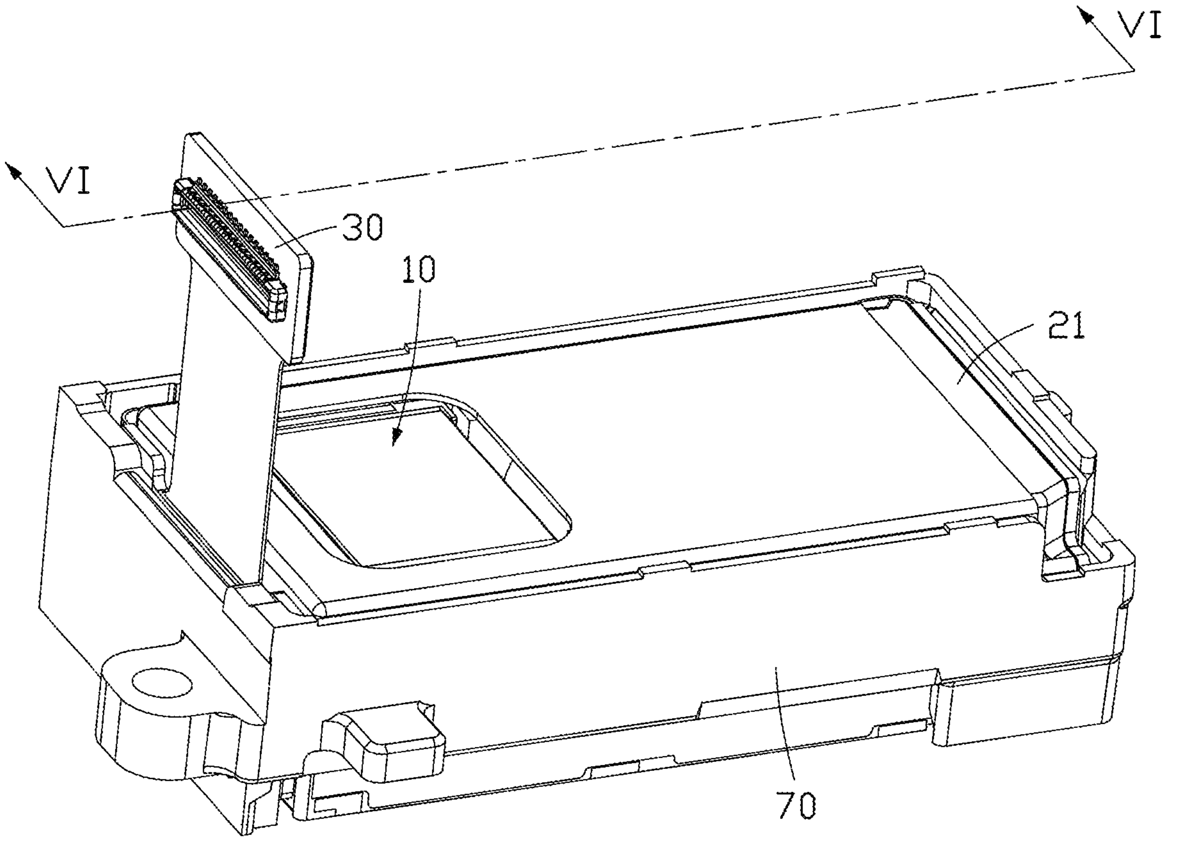
FIG. 1 is a diagrammatic view of a periscopic camera module according to an embodiment of the present disclosure.

It will be appreciated that for simplicity and clarity of illustration, where appropriate, reference numerals have been repeated among the different FIG. s to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
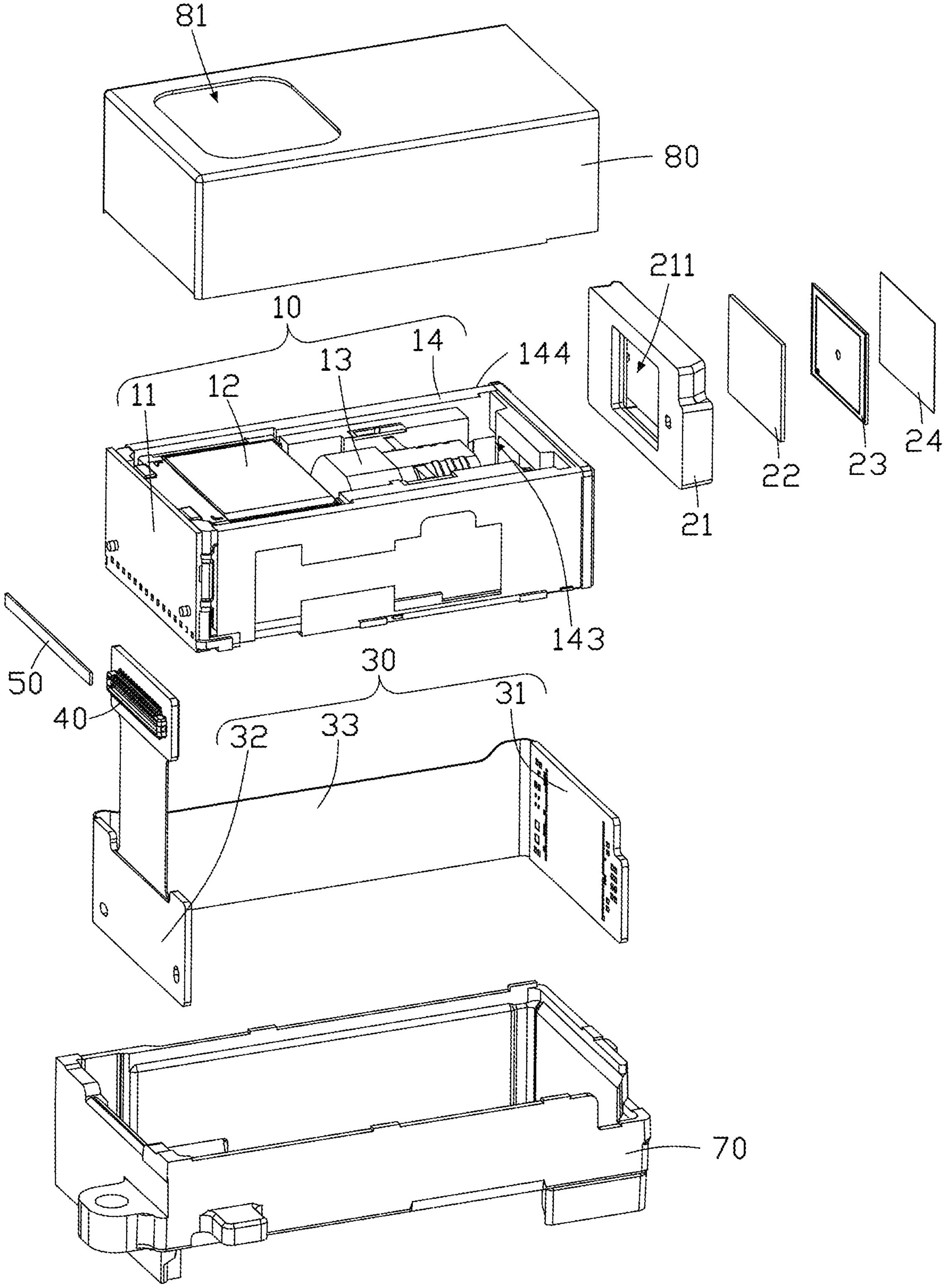
FIG. 2 is an exploded view of the periscopic camera module of FIG. 1.

Referring to FIGS. 1 and 2, an embodiment of a periscopic camera module 100 is provided, which includes a lens module 10, a photosensitive chip 23, a circuit board assembly 30, and a frame 70. The frame 70 may be substantially hollow cubic. The lens module 10, the photosensitive chip 23, and the circuit board assembly 30 are all received in the frame 70. A portion of the circuit board assemblies 30 may protrude from the frame 70.

The lens module 10 includes a driver 11, a light rotating element 12, a lens assembly 13, and a frame body 14. The frame body 14 defines a receiving groove 143 for receiving the light rotating element 12 and the lens assembly 13. The photosensitive chip 23 is disposed outside the frame body 14. The lens assembly 13 is arranged between the light rotating element 12 and the photosensitive chip 23, and may include a number of optical lenses (not shown). The light rotating element 12 can reflect light beams from an ambient environment towards the lens assembly 13, thereby changing a travelling direction of the light beams. The light beams then pass through the lens assembly 13 and are received by the photosensitive chip 23, and the photosensitive chip 23 generates image signals accordingly. In at least one embodiment, the optical lenses may be a combination of a spherical lens and an aspherical lens. The optical lenses may also be molded glass lenses. Thus, the image quality is improved.

Figure 3:
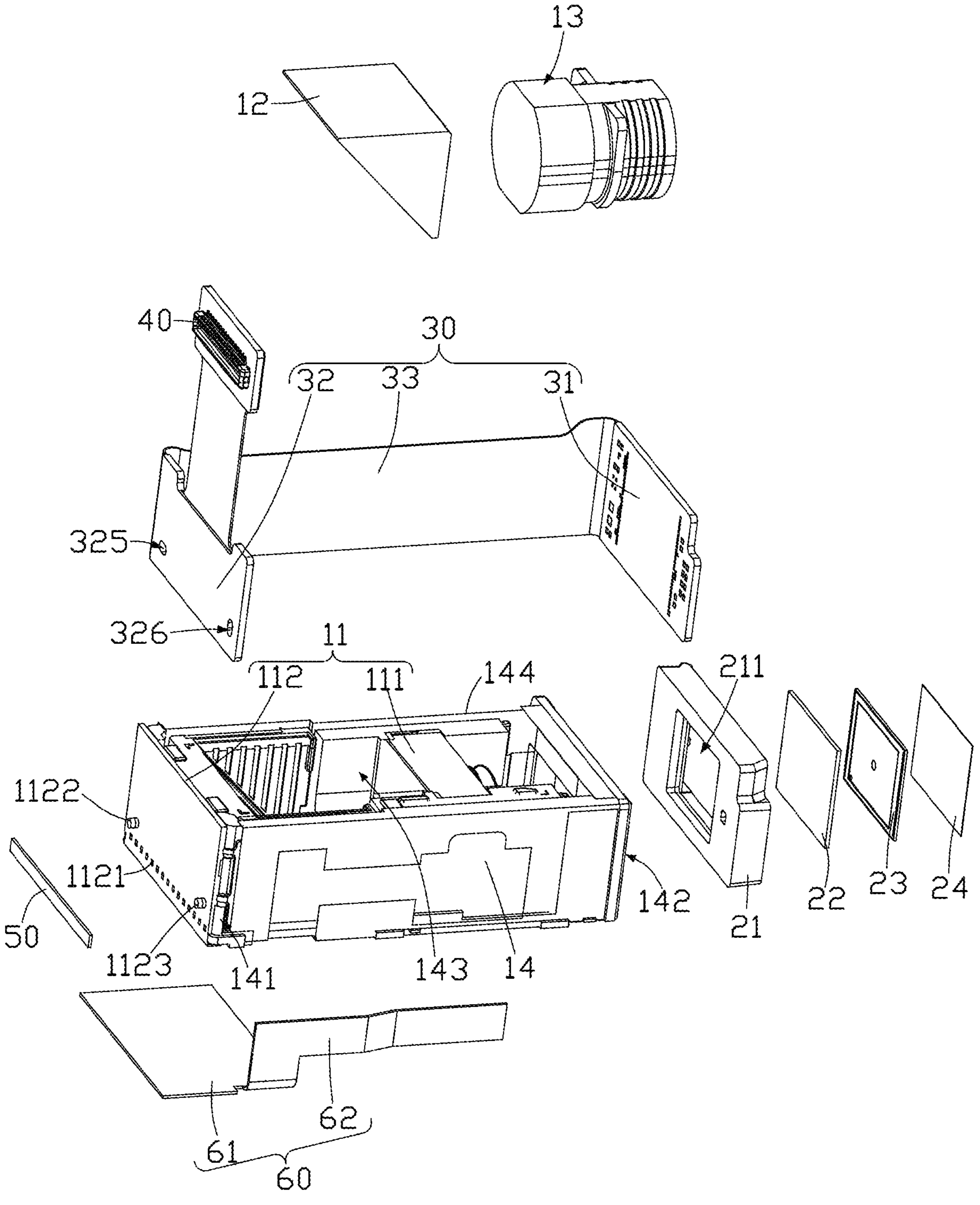
FIG. 3 is an exploded view of a lens module of the periscopic camera module of FIG. 2.

Referring to FIG. 3, the driver 11 includes a main body 111 and a drive chip 112 electrically connected to the main body 111. The driving chip 112 is used to control the main body 111 to move the lens assembly 13 along an optical axis of the lens assembly, thereby achieving auto-focusing. In at least one embodiment, the main body 111 may be a voice coil motor.

Figure 4:
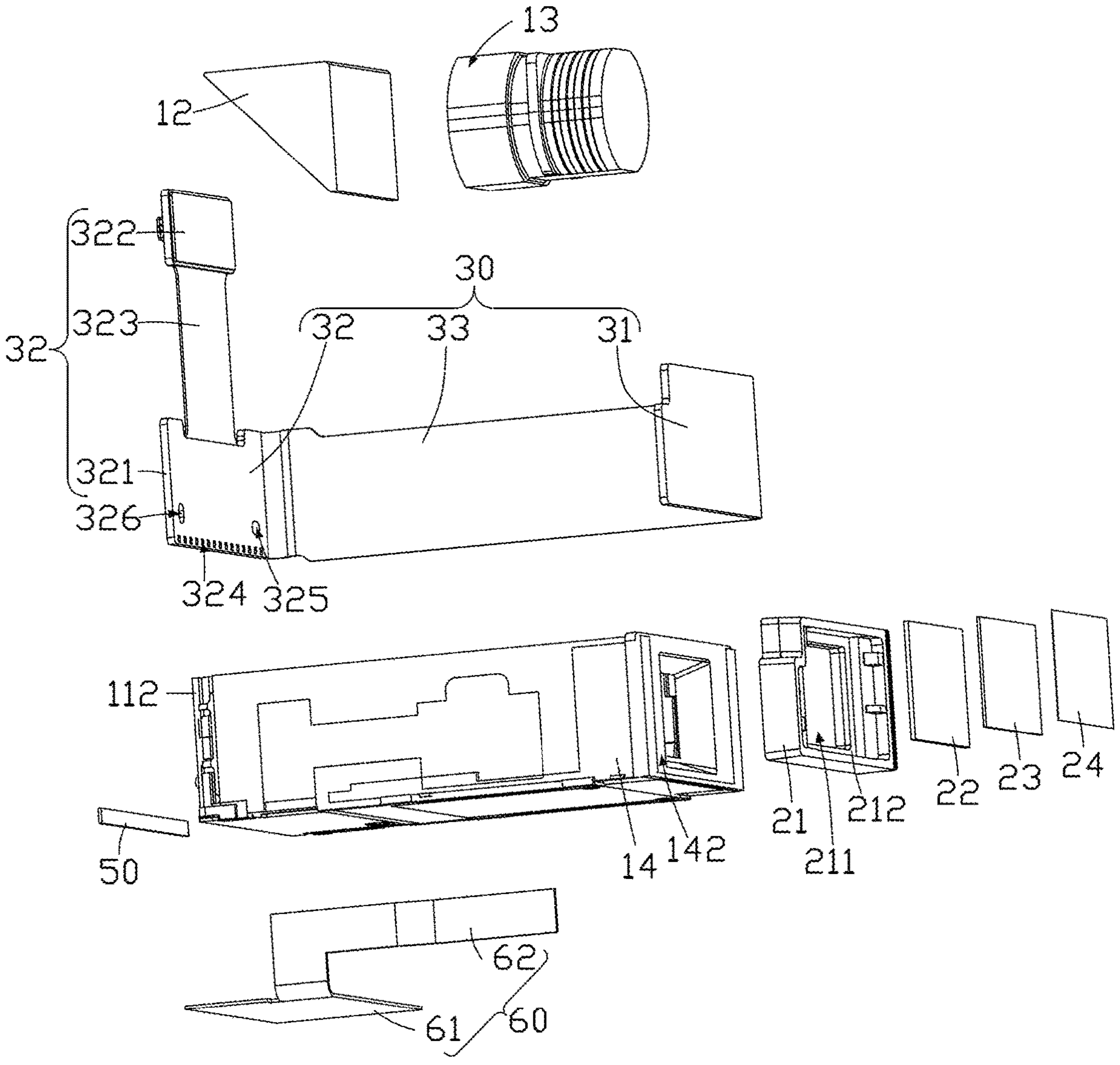
FIG. 4 is similar to FIG. 3, but showing the lens module from another angle.

Referring to FIGS. 3 and 4, in at least one embodiment, the frame body 14 may be substantially cubic. The frame body 14 has a first sidewall 141, a second sidewall 142 opposite to the first sidewall 141, and a third sidewall 144 connected between the first sidewall 141 and the second sidewall 142. The direction from the first sidewall 141 to the second sidewall 142 is actually a longitude direction of the frame body 14. The optical axis of the lens assembly 13 may be perpendicular to the first sidewall 141 and the second sidewall 142. The photosensitive chip 23 is fixed on the second sidewall 142. The drive chip 112 is fixed on the first sidewall 141 and electrically connected to the main body 111. A number of pins 1121 are provided on a surface of the driving chip 112 away from the first sidewall 141.

The circuit board assembly 30 includes a first circuit board 31, a second circuit board 32, and a third circuit board 33 connected between the first circuit board 31 and the second circuit board 32. The first circuit board 31 is arranged on a surface of the photosensitive chip 23 away from the second sidewall 142. The first circuit board 31 is electrically connected to the photosensitive chip 23, and can obtain the image signals from the photosensitive chip 23. The second circuit board 32 is arranged on a surface of the driving chip 112 away from the first sidewall 141. The third circuit board 33 is arranged on the third sidewall 144. In at least one embodiment, the first circuit board 31 is a rigid board. The third circuit board 33 is a soft (flexible) board. The second circuit board 32 includes a first board portion 321, a second board portion 322, and a third board portion 323 connected between the first board portion 321 and the second board portion 322. The pins 1121 are arranged on the first board portion 321. The second circuit board 32 is a rigid-soft board. The first board portion 321 and the third board portion 323 are rigid boards, and the second board portion 322 is soft board. An electrical connection portion 40 is provided on the third board portion 323. The electrical connection portion 40 can be a connector or gold fingers to realize signal transmission between the periscopic camera module 100 and other electronic components (not shown).

In at least one embodiment, the first circuit board 31, the second circuit board 32 and the third circuit board 33 are integrally formed, which can improve assembly efficiency. The first circuit board 31, the second circuit board 32, and the third circuit board 33 are bonded onto the inner wall of the frame 70.

Referring to FIG. 4, the second circuit board 32 includes a number of pads 324 on a surface of the second circuit board 32 facing the drive chip 112. The pads 324 and the pins 1121 electrically connect to each other, so that the second circuit board 32 and the drive chip 112 are electrically connected to each other. Thus, the drive chip 112 is electrically connected to the first circuit board 31, so that the drive chip 112 can control the main body 111 to operate according to the image signals sent from the first circuit board 31, thereby achieving the auto-focusing function.

In the related art, in order to electrically connect the circuit board to the drive chip, it is usually necessary to extend the bottom surface of the frame body outward to form an outer flange and set the pads on the outer flange (the thickness of the pads is at least about 0.5 mm). Then, the circuit board is placed on the outer flange and connects to the pads. In the present disclosure, the pins 1121 are provided on the drive chip 112, and the pads 324 are provided on the second circuit board 32. The pins 1121 and the pads 324 are electrically connected to each other, which eliminates the need of setting the outer flange on the frame body 14. Also, the positions of other components of the periscopic camera module 100 have no need to change to avoid the pads 324. Therefore, the lateral size of the periscopic camera module 100 is reduced.

In at least one embodiment, the periscopic camera module 100 further includes a fourth circuit board 60, which electrically connects the main body 111 to the drive chip 112. The fourth circuit board 60 includes a first portion 61 and a second portion 62 electrically connected to the first portion 61. The first portion 61 is arranged at the bottom of the frame body 14 and electrically connected to the drive chip 112. The second portion 62 is formed by bending a portion of the first portion 61 upward. The second portion 62 passes through the bottom of the frame body 14 and is electrically connected to the main body 111. In at least one embodiment, the second portion 62 is a soft board.

Referring to FIGS. 3 and 4, in at least one embodiment, a conductive adhesive layer 50, such as an ACF layer, is arranged between the second circuit board 32 and the drive chip 112. The pads 324 and the pins 1121 are electrically connected to each other through the conductive adhesive layer 50. The conductive adhesive layer 50 can further reduce the lateral size of the periscopic camera module 100 compared to soldering connection, and at the same time avoid the risk of continuous tin deposition. During manufacturing, a conductive adhesive is applied on the pads 324 of the second circuit board 32 or the pins 1121 of the drive chip 112, and then second circuit board 32 and the drive chip 112 are pressed together. The conductive adhesive is solidified to form the conductive adhesive layer 50, which electrically connects the pads 324 to the pins 1121.

In at least one embodiment, the thickness of the conductive adhesive layer 50 is between 7 μm to 30 μm. For example, the thickness of conductive adhesive layer 50 is 7 μm, 8 μm, 10 μm, 12 μm, 15 μm, 20 μm, 25 μm, or 30 μm. Thus, the thickness of the conductive adhesive layer 50 is much less than that of the existing solder pad (at least 0.5 mm). Thus, the conductive adhesive layer 50 not only ensures the electrical connection between the second circuit board 32 and the drive chip 112, but also reduce the distance between the drive chip 112 and the second circuit board 32, thereby reducing the lateral size of the periscopic camera module 100.

Figure 5:
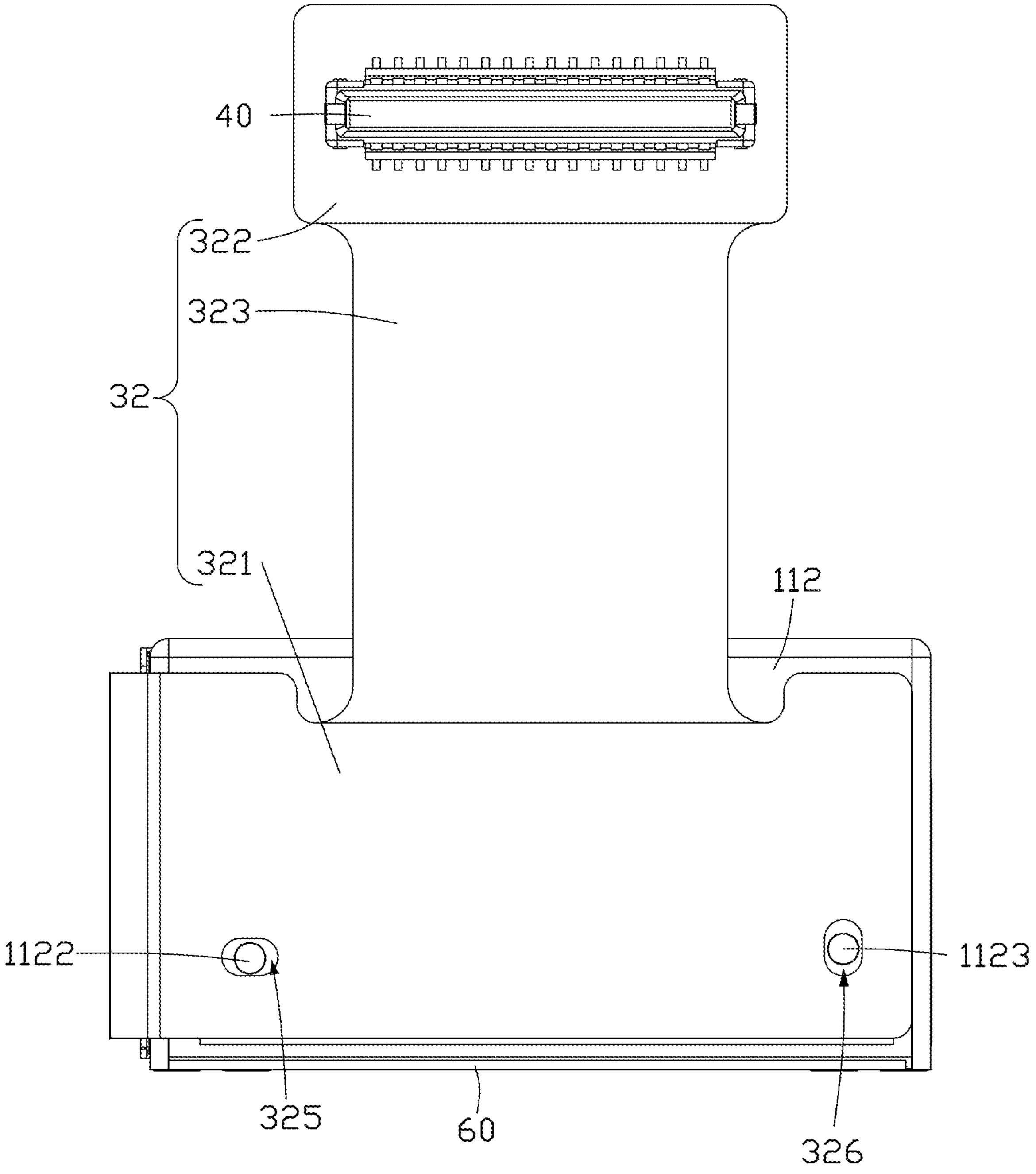
FIG. 5 is a diagrammatic view showing a second circuit board connected to a drive chip.
Figure 6:
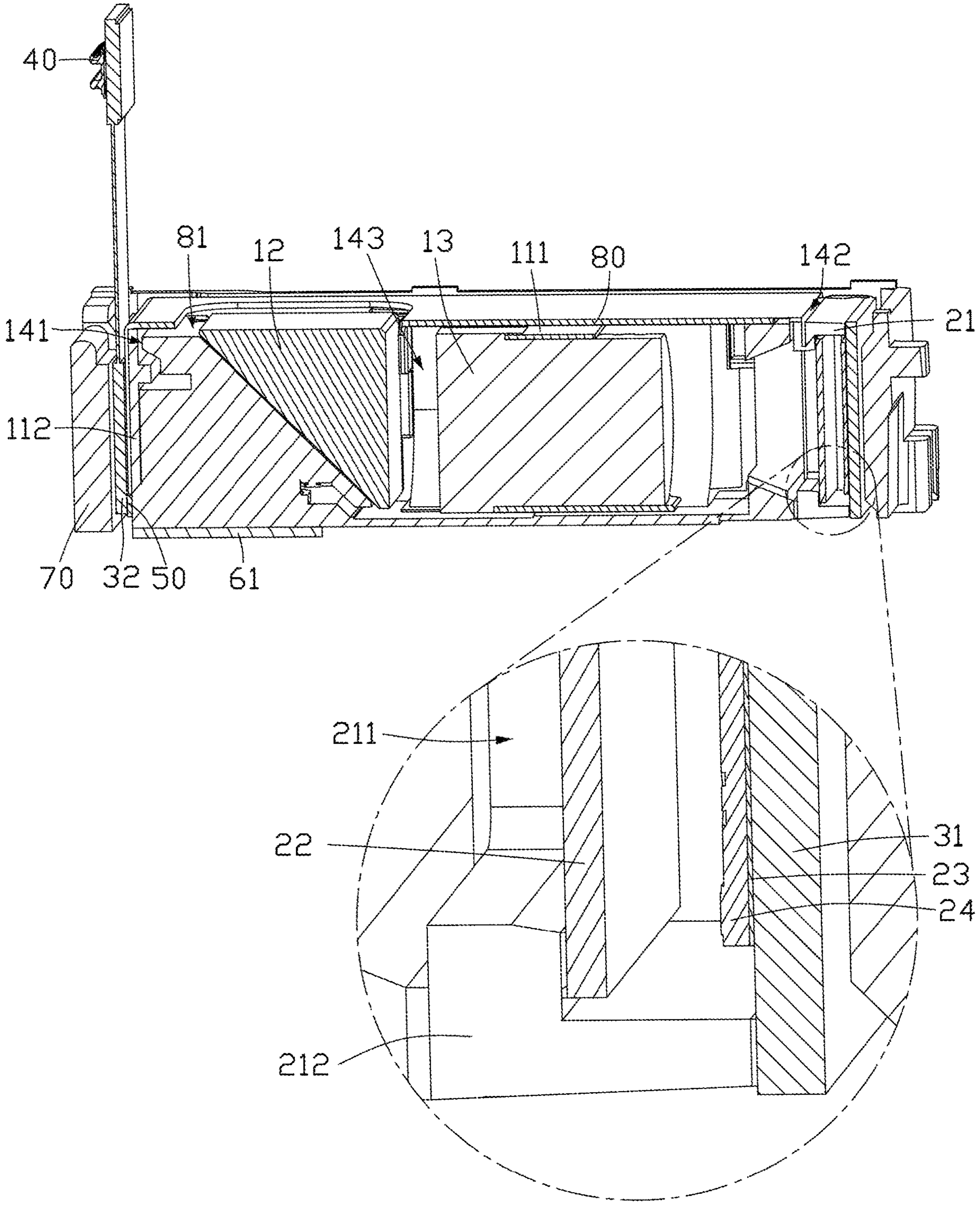
FIG. 6 is a cross-sectional view along VI-VI of FIG. 1.

Referring to FIGS. 3 to 5, in at least one embodiment, a first positioning post 1122 and a second positioning post 1123 are provided on the drive chip 112. A first positioning hole 325 and a second positioning hole 326 are defined on the second circuit board 32. The first positioning post 1122 is inserted into the first positioning hole 325, and the second positioning post 1123 is inserted into the second positioning hole 326. Thus, an alignment accuracy between the pads 324 and the pins 1121 is improved.

In at least one embodiment, the pins 1121 are arranged side by side in a row and close to the lower edge of the drive chip 112. The first positioning post 1122 and the second positioning post 1123 are arranged above the pins 1121, and are respectively close to another two edges of the drive chip 112. The first positioning hole 325 and the second positioning hole 326 are waist-shaped holes. A length direction of the first positioning hole 325 is perpendicular to a length direction of the second positioning hole 326. Thus, the positions of the first positioning post 1122 and the second positioning post 1123 in the first positioning hole 325 and the second positioning hole 326 are limited, which improves the alignment accuracy between the pads 324 and the pins 1121.

Referring to FIGS. 3 and 4, in at least one embodiment, the light rotating element 12 is a prism or a plane mirror. In this embodiment, the light rotating element 12 is a triangular prism, and a cross section of the prism is a right triangle. At this time, the light beams enter one right angle side of the right triangle, and then exit from the other right angle side after being reflected by the hypotenuse. That is, the travel direction of the light beams can change by 90 degrees when passing through the light steering element 12. For example, the light beams incident from the vertical direction will exit from the horizontal direction when passing through the light steering element 12. The light rotating element 12 may be made of glass, plastic, and other materials with good light transmission property. In at least one embodiment, a material that can reflect the light beams, such as a silver coating, may be coated on the corresponding surface of the prism to reflect the light beams. In at least one embodiment, the periscopic camera module may further include a housing 80 sleeved on the frame body 14. The housing 80 defines an inlet 81, and the light rotating element 12 is arranged at the inlet 81.

Referring to FIGS. 2 to 4 and 6, the periscopic camera module 100 further includes a support 21, a filter 22, and an adhesive layer 24. The support 21 is bonded to the second sidewall 142 of the main body 111. The support defines a through hole 211. The first circuit board 31 is arranged on a surface of the support 21 away from the main body 111. The frame 21 extends from the inner wall of the through hole 211 to a central axis of the through hole 211 to form a flange 212. The filter 22 is arranged on a surface of the flange 212 facing the first circuit board 31. The adhesive layer 24 is arranged between the photosensitive chip 23 and the first circuit board 31. The photosensitive chip 23 is bonded to the first circuit board 31 through the adhesive layer 24 and disposed in the frame 21. The photosensitive chip 23 is electrically connected to the first circuit board 31. The first circuit board 31, the third circuit board 33, and the second circuit board 32 can transmit the image signals generated by the photosensitive chip 23 to the driving chip 112. Then, the driving chip 112 controls the main body 111 to drive the optical lenses to move according to the signals.

Figure 7:
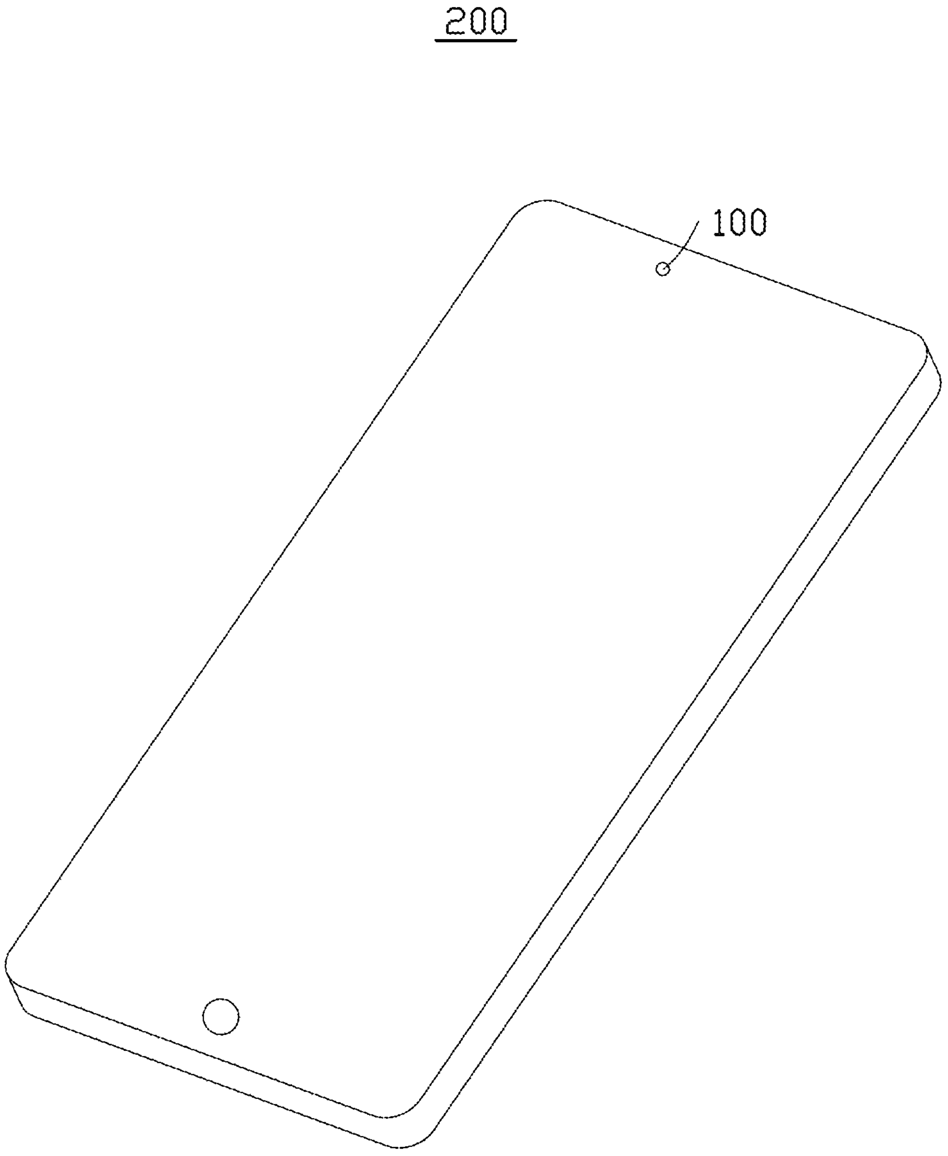
FIG. 7 is a diagrammatic view of an electronic device according to an embodiment of the present disclosure.

Referring to FIG. 7, an embodiment of an electronic device 200 is also provided. The electronic device 200 may be a mobile phone, a wearable device, a vehicle, or a monitoring device.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A periscope camera module comprising:

a lens module comprising a driver and a frame body, the driver comprising a main body and a driving chip electrically connected to the main body, the frame body comprising a first sidewall and a second sidewall opposite to the first sidewall, the driving chip being arranged on the first sidewall, a plurality of pins being provided on a surface of the driving chip away from the first sidewall;

a photosensitive chip arranged on the second sidewall; and a circuit board assembly comprising a first circuit board and a second circuit board electrically connected to the first circuit board, the first circuit board being arranged on a surface of the photosensitive chip away from the second sidewall and electrically connected to the photosensitive chip, the second circuit board being arranged on a surface of the drive chip away from the first sidewall, a plurality of pads being provided on a surface of the second circuit board facing the drive chip, the plurality of pads being electrically connected to the plurality of the pins;

wherein the drive chip further comprises a first positioning post and a second positioning post, the second circuit board further defines a first positioning hole and a second positioning hole, the first positioning post is received in the first positioning hole, and the second positioning post is received in the second positioning hole.

2. The periscope camera module according to claim 1, further comprising a conductive adhesive layer arranged between the second circuit board and the drive chip, wherein the plurality of pads is electrically connected to the plurality of the pins through the conductive adhesive layer.

3. The periscope camera module according to claim 2, wherein a thickness of the conductive adhesive layer is between 7 μm to 30 μm.

4. The periscope camera module according to claim 1, wherein the first positioning hole and the second positioning hole are waist-shaped holes, and a length direction of the first positioning hole and a length direction of the second positioning hole are perpendicular to each other.

5. The periscope camera module according to claim 1, wherein the circuit board assembly further comprises a third circuit board connected between the second circuit board and the first circuit board, the frame body further comprises a third sidewall connected between the first sidewall and the second sidewall, and the third circuit board is arranged on the third sidewall.

6. The periscope camera module according to claim 5, wherein the first circuit board, the second circuit board, and the third circuit board are integrally formed.

7. The periscope camera module according to claim 1, wherein the lens module further comprises a light rotating element and a lens assembly, the frame body defines a receiving groove configured for receiving the light rotating element and the lens assembly.

8. The periscope camera module according to claim 7, further comprising a frame configured for receiving the photosensitive chip, the lens module, and the circuit board assembly.

9. The periscope camera module according to claim 7, wherein the light rotating element is a triangular prism, and a cross section of the prism is a right triangle.

10. An electronic device comprising:

a periscope camera module comprising:

a lens module comprising a driver and a frame body, the driver comprising a main body and a driving chip electrically connected to the main body, the frame body comprising a first sidewall and a second sidewall opposite to the first sidewall, the driving chip being arranged on the first sidewall, a plurality of pins being provided on a surface of the driving chip away from the first sidewall;

a photosensitive chip arranged on the second sidewall; and a circuit board assembly comprising a first circuit board and a second circuit board electrically connected to the first circuit board, the first circuit board being arranged on a surface of the photosensitive chip away from the second sidewall and electrically connected to the photosensitive chip, the second circuit board being arranged on a surface of the drive chip away from the first sidewall, a plurality of pads being provided on a surface of the second circuit board facing the drive chip, the plurality of pads electrically connected to the plurality of the pins;

wherein the drive chip further comprises a first positioning post and a second positioning post, the second circuit board further defines a first positioning hole and a second positioning hole, the first positioning post is received in the first positioning hole, and the second positioning post is received in the second positioning hole.

11. The electronic device according to claim 10, wherein the periscope camera module further comprises a conductive adhesive layer arranged between the second circuit board and the drive chip, and the plurality of pads is electrically connected to the plurality of the pins through the conductive adhesive layer.

12. The electronic device according to claim 11, wherein a thickness of the conductive adhesive layer is between 7 μm to 30 μm.

13. The electronic device according to claim 10, wherein the first positioning hole and the second positioning hole are waist-shaped holes, and a length direction of the first positioning hole and a length direction of the second positioning hole are perpendicular to each other.

14. The electronic device according to claim 10, wherein the circuit board assembly further comprises a third circuit board connected between the second circuit board and the first circuit board, the frame body further comprises a third sidewall connected between the first sidewall and the second sidewall, and the third circuit board is arranged on the third sidewall.

15. The electronic device according to claim 14, wherein the first circuit board, the second circuit board, and the third circuit board are integrally formed.

16. The electronic device according to claim 10, wherein the lens module further comprises a light rotating element and a lens assembly, the frame body defines a receiving groove configured for receiving the light rotating element and the lens assembly.

17. The electronic device according to claim 16, wherein the periscope camera module further comprises a frame configured for receiving the photosensitive chip, the lens module, and the circuit board assembly.

18. The electronic device according to claim 16, wherein the light rotating element is a triangular prism, and a cross section of the prism is a right triangle.

* * * * *